United States Patent [19]

Skinner et al.

[11] Patent Number: 5,737,397
[45] Date of Patent: Apr. 7, 1998

[54] MODEM HAVING SEPARATE MODEM ENGINE AND DATA ACCESS ARRANGEMENT

[75] Inventors: Benjamin H. Skinner, Spring; Robert F. Watts, Houston, both of Tex.; Paul E. Nagel, Draper, Utah

[73] Assignee: Compaq Computer Corporation, Houston, Tex.

[21] Appl. No.: 727,283

[22] Filed: Oct. 9, 1996

Related U.S. Application Data

[63] Continuation of Ser. No. 304,262, Sep. 12, 1994, abandoned, which is a continuation-in-part of Ser. No. 973,625, Nov. 9, 1992, Pat. No. 5,428,671, and Ser. No. 148,661, Nov. 5, 1993, abandoned, which is a continuation-in-part of Ser. No. 973,625, Nov. 9, 1992, Pat. No. 5,428,671, and Ser. No. 972,949, Nov. 6, 1992, abandoned.

[51] Int. Cl.⁶ .................................................. H04M 11/00
[52] U.S. Cl. ........................... 379/93.29; 379/93.26; 379/93.05; 375/222
[58] Field of Search .................................. 379/93, 94, 95, 379/96, 97, 98, 99, 100, 405; 375/222, 223

[56] References Cited

U.S. PATENT DOCUMENTS

| | | | |
|---|---|---|---|
| 3,991,288 | 11/1976 | George et al. | 379/338 |
| 4,543,450 | 9/1985 | Brandt | 375/222 |
| 4,620,294 | 10/1986 | Leung et al. | 375/222 |
| 4,788,717 | 11/1988 | Blanchard et al. | 379/98 |
| 4,868,863 | 9/1989 | Hartley et al. | 379/93 |
| 5,134,648 | 7/1992 | Hochfield et al. | 379/93 |
| 5,245,654 | 9/1993 | Wilkison et al. | 379/405 |
| 5,283,638 | 2/1994 | Engberg et al. | 379/93 |
| 5,408,520 | 4/1995 | Clark et al. | 379/93 |
| 5,457,601 | 10/1995 | Georgopulos et al. | 375/222 |

FOREIGN PATENT DOCUMENTS

| | | |
|---|---|---|
| 459 279 | 5/1991 | European Pat. Off. |
| 602 894 | 12/1993 | European Pat. Off. |

OTHER PUBLICATIONS

Modems: Anpassung auf französisch (1989).

*Primary Examiner*—Curtis Kuntz
*Assistant Examiner*—Stephen W. Palan
*Attorney, Agent, or Firm*—Pravel, Hewitt, Kimball & Krieger

[57] ABSTRACT

A modem which is separated into two circuit boards. One board contains the modem engine, while the second board contains the codec and the DAA components. The two boards are connected using only properly isolated digital signals so that the modem engine board does not require certification, only the codec/DAA board requiring certification. The codec/DAA board is contained in a housing to provide proper high voltage protection.

6 Claims, 4 Drawing Sheets

MODEM HAVING SEPARATE MODEM ENGINE AND DATA ACCESS ARRANGEMENT

This is a continuation of U.S. application Ser. No. 08/304,262, filed Sep. 12, 1994, now abandoned, which is a continuation-in-part of Ser. No. 07/973,625 filed Nov. 9, 1992, now U.S. Pat. No. 5,428,671 and of Ser. No. 08/148,661, filed Nov. 5, 1993, now abandoned which in turn is a continuation-in-part of Ser. No. 07/973,625 filed Nov. 9, 1992 now U.S. Pat. No. 5,428,671 and Ser. No. 07/972,949 filed Nov. 6, 1992, now abandoned.

BACKGROUND OF THE INVENTION

1. Field of the Invention

The invention relates to modems used in digital communications and more particularly to the arrangement of components forming the modem.

2. Description of the Related Art

As the computer market becomes more global, a manufacturer obviously wishes to be in as many countries as possible to increase its market share and revenues. However, this internationalization has created a number of problems in many areas. Everyone is familiar with the problems of the different languages and there are various solutions to this set of problems. Another common problem is voltage differences for the AC lines, but this is also a well known problem and can be readily handled by using different power supplies or ones that can handle multiple input voltages.

A lesser known area of international concern is in the modem area. Each country has different telephone connections and different electrical standards for the telephone interface. In the past, this has always required certifying the entire modem for each country in which it is to be sold. This has resulted in a tremendous logistical problem, and therefore, lesser distribution of many modem products. It was not worth the time and effort to qualify a modem in many different countries each time there was a change to the modem design, as the entire qualification process had to be repeated. This qualification problem either increased the cost of modems or limited the technology available. Therefore, there is a need for a modem which can be easily upgraded without requiring recertification with each upgrade.

SUMMARY OF THE INVENTION

A modem according to the present invention separates the modem into two portions, a modem engine portion and a data access arrangement (DAA) portion. Only the DAA portion needs to be certified; the modem engine portion does not require certification. This allows the performance and capabilities of the modem engine to be upgraded as desired. The upgraded modem engine is then connected to the previously certified DAA portion. Thus, upgrades to the modem can be easily performed and recertification is not required.

A modem according to the preferred embodiment places the host computer interface, the modem microcontroller and the digital signal processing (DSP) components on the modem engine board. The DAA board includes the codec and the remaining standard DAA components, such as ring detection and hybrid circuitry. All interfaces between the DAA board and the basic modem engine board are done using digital signals. No analog signals whatsoever are transmitted and all digital signals either drive relays or are provided as outputs of optoisolated components, except for those digital signals provided to and from the codec. Therefore, no analog signals are transmitted from the board, only digital signals. The certification bodies do not have concerns with the transmission of the digital signals, only with analog signals which are not properly isolated. Therefore, with a modem designed according to the present invention, the certification bodies require qualifying only the DAA board containing the DAA components and the codec and do not require recertifying the modem engine board with each change to the components on the modem engine board.

Further, the DAA board is contained and fully encapsulated in a housing, preferably a plastic housing, so that all of the high voltage circuits are not accessible to the user without destruction of the housing. Therefore, the various safety bodies also are satisfied with the design.

Therefore, by the use of a modem with the components arranged in separate circuit boards as indicated according to the present invention, international certification is required of only a limited component set, with changes to the remaining components being made freely and not requiring certification.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
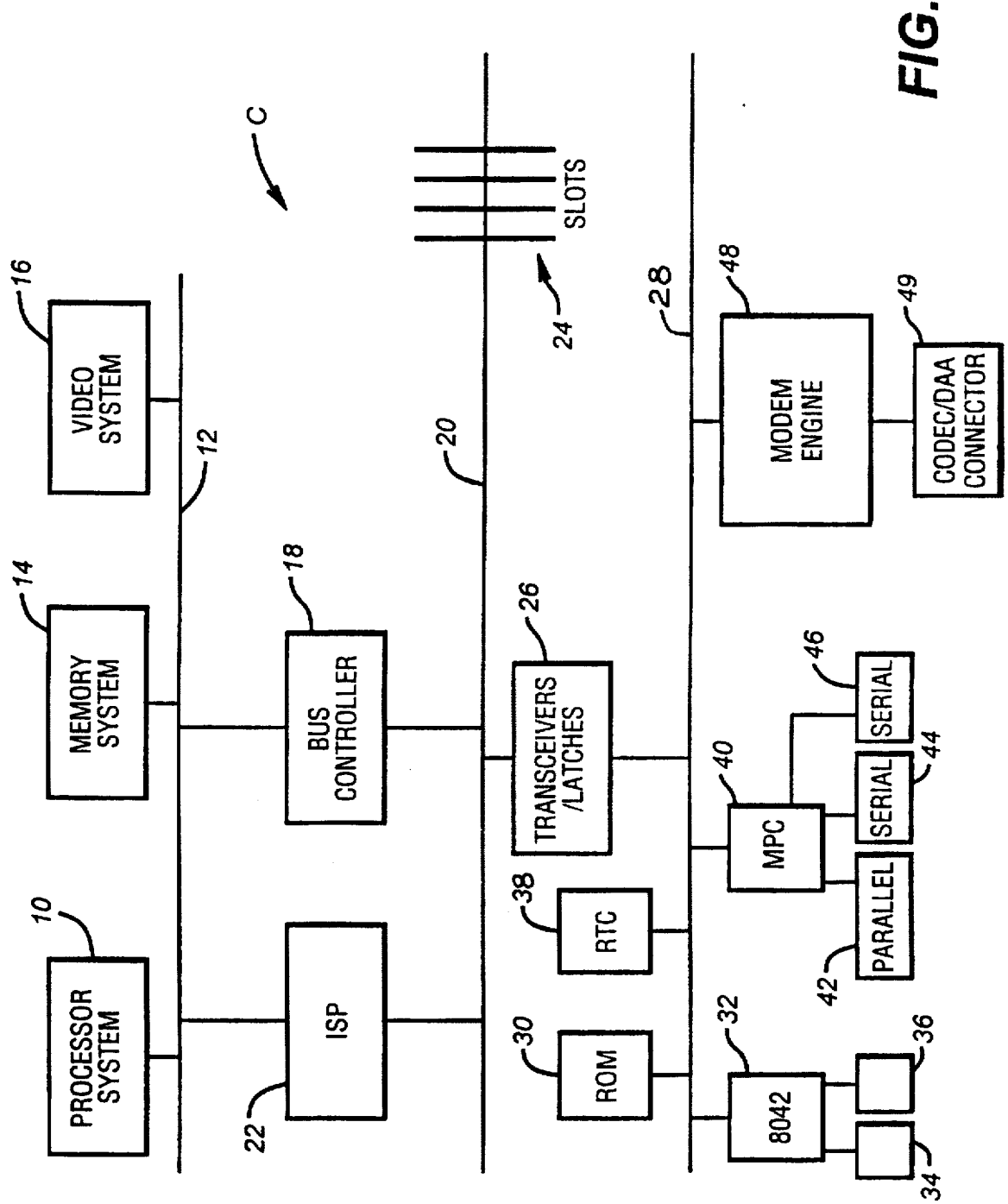
FIG. 1 is a block diagram of a computer system incorporating a modem engine according to the present invention.

A computer system C incorporating a modem according to the present invention is shown in FIG. 1. The computer system C includes a processor system 10 such as simply a microprocessor, such as an Intel® 486 or PENTIUM, or a more complete processor system including a microprocessor, a cache controller and other components. The processor system 10 is connected to a host bus 12 for communications. A memory system 14 is connected to the host bus 12, as is a video system 16. A bus controller 18 is connected between the host bus 12 and an input/output bus 20 such as an EISA/ISA bus. An integrated system peripheral (ISP) 22, which contains numerous system elements such as a DMA controller, an interrupt controller and so on, as is conventional, is connected to both the host bus 12 and EISA/ISA bus 20. A series of slots 24 for receiving interchangeable circuit cards are also provided on the EISA/ISA bus 20. A set of transceivers and latches 26 are connected between the EISA/ISA bus 20 and an X bus 28. Logically, the X bus 28 is identical to the EISA/ISA bus 20, but is provided as a separate bus for electrical loading reasons. Connected to the X bus 28 are various components which are conventionally located on the system board of the computer system C. These include the read only memory (ROM) 30, which provides the BIOS and other system level instructions and an 8042 keyboard controller 32, which is connected to a keyboard port 34 and an auxiliary or pointing device port 36. A real time clock (RTC) 38 is connected to the X bus 28, as is a multiple peripheral component (MPC) 40. The multiple peripheral component 40 includes a parallel port 42 and two serial ports 44 and 46 used for communications purposes. Of interest in this description, a modem engine 48 is also connected to the X bus 28. The modem 48 is connected to a codec/DAA connector 49.

The computer system of FIG. 1 is exemplary and numerous other computer system designs could be used. Further the modem engine 48 can be located directly on the EISA/ISA bus 20 or other similar bus or could alternatively be located directly on the host bus 12. The exact location is not critical to the present invention. Preferably, in the preferred embodiment, all of the components illustrated in FIG. 1 are located on a single circuit board, so that the modem engine 48 is integrated in the computer system C. Further, though not as preferable, the modem engine 48 could be an external device connected to a serial port 44 or 46.

Figure 2:
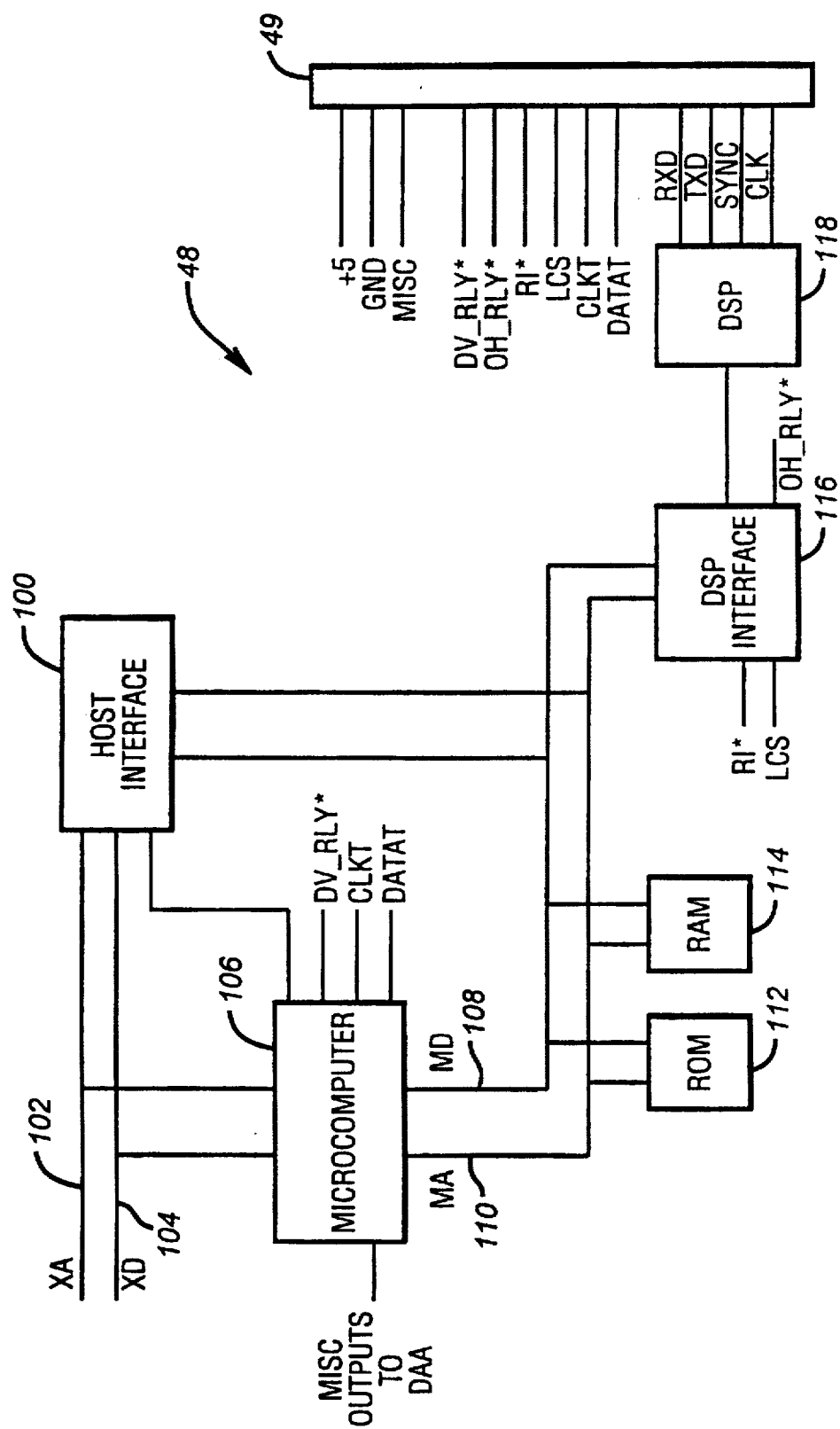
FIG. 2 is a block diagram of the modem engine of FIG. 1.

Proceeding now to FIG. 2, the modem engine 48 is shown in more detail. A host interface block 100 is connected to the XA and XD lines 102 and 104 which form the address and data portions of the X bus 28. The control signals are similarly connected to portions of the X bus 28 but are not shown for simplicity. The host interface 100 is used to provide the primary interface to the processor 10 as is conventional for modem operations. Therefore, the host interface 100 conforms to the conventional UART definitions and is designed to be located at the conventional address locations.

The XA bus 102 and XD bus 104 are also connected to a microcomputer 106 to allow direct access to certain functions of the microcomputer 106. Additionally, the microcomputer 106 is connected to the host interface 100 via certain designated control pins to allow control of functions of the host interface 100. Additionally, a memory data bus 108 and a memory address bus 110 are provided from the microcomputer 106 for accessing external memory devices and memory-mapped I/O devices. A memory control bus is also provided, but is not shown for simplicity. These external memory devices include a ROM 110 which includes the operating instructions for the microcomputer 106 and a RAM 114 which provides additional memory with the microcomputer 106. The host interface 100 is a memory-mapped I/O device, and thus connected to the memory address bus 110 and the memory data bus 108, to allow high speed communications between the microcomputer 106 and the host interface 100. In addition, a DSP interface 116, as is well known, is connected to the memory data bus 108 and the memory address bus 110 to allow parallel format communication between the microcomputer 106 and the DSP interface 116. The DSP interface 116 is connected to the DSP or digital signal processor chip 118 which performs the calculations to provide desired modem functions. The DSP 118 is a conventional unit such as the DSP 16a provided by AT&T. The DSP interface 116 is preferably the companion chip to the DSP 118. The DSP interface 116 and the DSP 118 provide the data pump for the modem engine 48. The microcomputer 106 is preferably a conventional 8 bit microcomputer.

Figure 3:
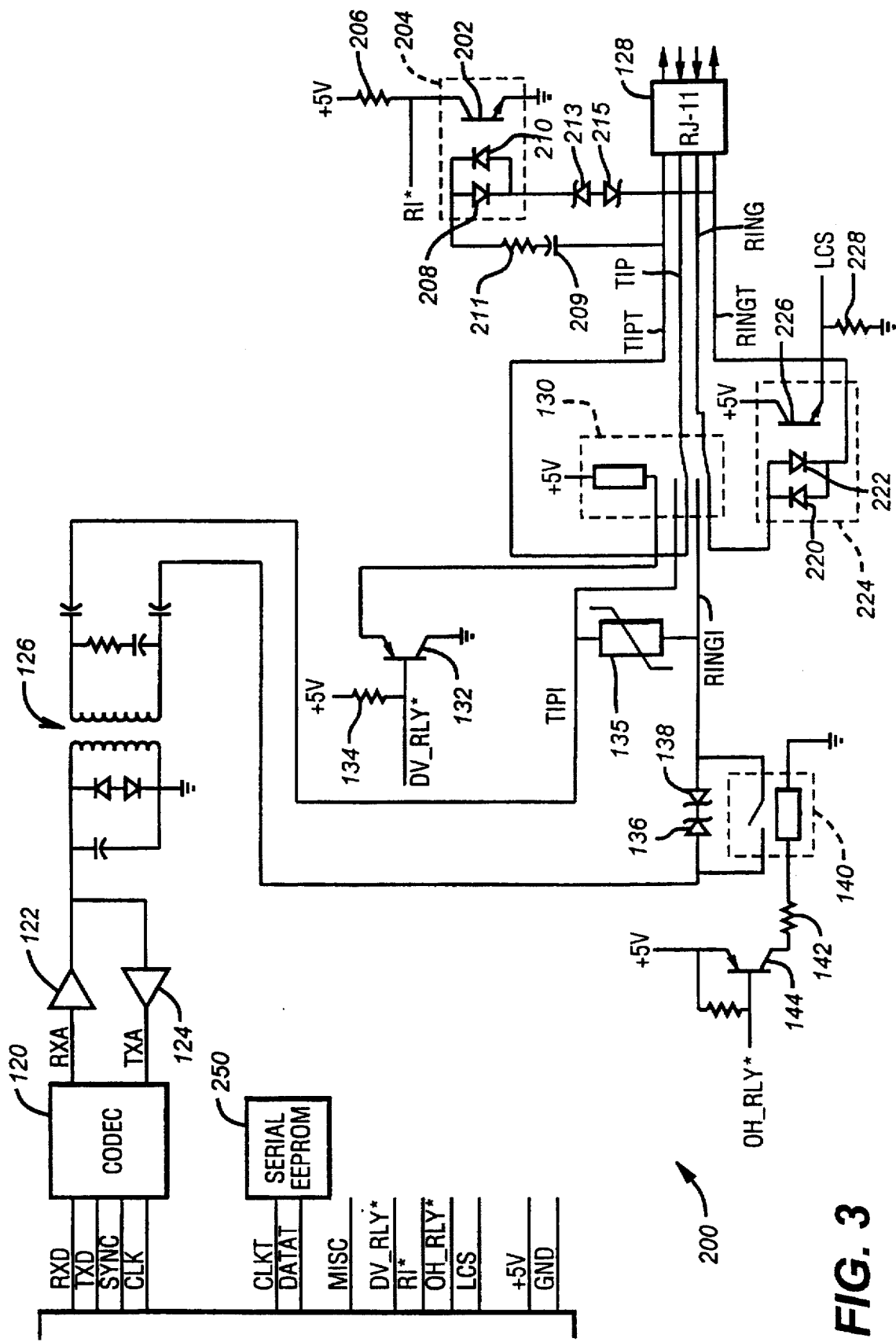
FIG. 3 is a block diagram of a codec/DAA board for use with the modem engine of FIG. 2, and for installation and use with the computer system of FIG. 1.

Certain interface signals are necessary to connect the modem engine 48 to the codec/DAA board 200 (FIG. 3). Referring then to FIG. 3 to help complete the description of FIG. 2, the codec/DAA circuit board 200 components are shown. These include a codec 120 designed to cooperate with the DSP 118. It is noted that the codec/DAA board 200 is shown in simplified format and certain detailed components are not shown to simplify the illustration. The detailed components are well known to those skilled in the art. The codec 120 provides an RXA or receive analog signal to an amplifier 122 and receives a TXA or transmit analog signal from an amplifier 124. The output of the amplifier 122 and the input of the amplifier 124 are connected together and to one terminal of a first side winding of a hybrid transformer 126 as commonly used in telephone connections. The second terminal of the first side winding is connected to ground.

An RJ-11 jack 128 is provided to receive certain telephone signals, such as TIP and RING as conventionally used, and to provide TIPT and RINGT signals to a connected telephone handset. The jack 128 receives an adapter cable (not shown) to allow connection to the telephone line and to allow connection of an external telephone set. Preferably, the TIP and RING signals are provided from the RJ-11 jack 128 to the common poles of a two pole, two position, relay 130. The relay 130 has one coil terminal connected to a +5V signal, and the second terminal connected to the emitter of a PNP transistor 132, whose collector is connected to ground. The base of the transistor 132 is connected through a pull-up resister 134 to +5V and receives the DV_RLY* or device relay inverted signal. Thus, if the DV_RLY* signal is provided high or is not present, the TIP signal is normally connected to the TIPT signal, and similarly, the RING signal is normally connected to the RINGT signal. In this manner, when the DV_RLY* signal is disabled or in the high state, the relay 130 is disabled and the TIP and RING signals are provided back to the RJ-11 jack 128 to the external telephone set to allow it to be utilized.

If the modem is to be utilized, the relay 130 is activated by taking the DV_RLY* signal to a low level, activating the transistor 132, so that the TIP and RING signals are then provided to TIPI and RINGI or TIP internal and RING internal signals. An MOV protection device 135 is connected between the TIPI and RINGI signals for circuit protection. The TIPI signal is coupled to one terminal of the second side winding of the transformer 126, while the second terminal of the second side winding of the transformer 126 is coupled through a pair of reverse series connected Zener diodes 136 and 138 to the RINGI signal. An off hook relay 140 is connected across the diodes 136 and 138, so that when the off hook relay 140 is activated, a short circuit is formed around the diodes 136 and 138, so that the second terminal of the second side winding of the transformer 126 is then directly connected to the RINGI circuit, thus placing the modem off hook. One side of the coil on the off hook relay 140 is connected to ground, with the other side connected through a pull-up resistor 142 and a PNP transistor 144 to a +5 volt signal. An OH_RLY* signal is provided to the base of the transistor 144 to select whether the modem is on hook or off hook. When the OH_RLY signal is low, the off hook relay 140 is activated and the modem is off hook.

Certain signals also need to be provided from the codec/DAA board 200 to the modem engine 48. These include a ring indication or RI* signal which is provided at the collector of an NPN transistor 202 contained in an optoisolator 204. The emitter of the transistor 202 is connected to ground, with the collector pulled up to +5 volts via a pull-up resistor 206. A pair of parallel, opposed diodes 208 and 210 are contained in the optoisolator 204 to provide light to the base of the transistor 202. The diodes 208, 210 are coupled between the TIPT and RINGT signals by the use of a series capacitor 209 and resistor 211 and reverse series connected Zener diodes 213 and 215. In this way, the ring indicator optoisolator 204 provides the RI* signal only when voltage is sufficient to indicate a ring voltage is present. As the optoisolator 204 is present, the RI* signal is positively separated or decoupled from the analog signals as necessary for certification purposes. Similarly, the use of the relays 130 and 140 provide similar isolation for outputs provided from the modem engine 48.

The RINGT signal is passed through a pair of parallel, opposed diodes 220 and 222 in an optoisolator 224 so that should current flow in the RINGT signal conductor, the diodes 222 and 220 provide light to the base of an NPN transistor 226 contained in the optoisolator 224. The collector of the transistor 226 is connected to +5V and the emitter is connected to ground by a resistor 228. The emitter of the transistor 226 provides the LCS or loop current signal to indicate that loop current is being drawn, indicating that the external telephone set connected to the RJ-11 connector 128 is off hook. By monitoring the LCS signal, the modem engine 48 will not cause the modem to go off hook while the external telephone set is in use.

The codec 120 is connected to the DSP 118 by four signals referred to as RXD, TXD, SYNC and CLK. The RXD and TXD signals are the receive and transmit digital signals, while the SYNC and CLK signals are conventional signals as utilized between a DSP 118 and a codec 120.

Additionally, a serial EEPROM device 250 is located on the codec/DAA board 200 to provide country code configuration data, as the actual components and requirements of the codec/DAA board 200 vary from country to country. The use of the EEPROM 250 allows the microcontroller 106 to operate properly in each country. Two signals, a CLKT and a DATAT are provided to serial EEPROM 250.

All of the signals connecting the codec/DAA board 200 to the modem engine 48 are provided to a connector 149, which can be directly connected to the connector 49 or can be connected by use of a cable with appropriate mating connectors.

Referring back to the modem engine 48 of FIG. 2, the CLKT and DATAT signals are connected to the microcomputer 106 to allow it to interrogate the serial EEPROM 250 to determine the specific country for which the codec/DAA module 200 is designed. The DV_RLY* signal is provided from the microcomputer 106. In addition, miscellaneous output control signals are provided by the microcontroller 106 for alternate embodiments of the codec/DAA module 200. In alternate embodiments used in different countries, it is desirable to have additional features, and therefore, these features are activated by the microcomputer 106 by the use of the miscellaneous output control signals. The outputs can include a DET_RLY* signal used to control circuitry to provide a secondary loop current detector when off hook in voice mode when an external telephone set is in use as required in certain countries, an EARTH_RLY* signal used with a relay to connect the TIP or RING signals to ground to request dial tone in certain countries, a SHUNT_RLY* signal used with proper circuitry to provide proper DC characteristics as necessary in some countries, HYB_CTL1 and HYB_CTL2 signals used to cause inclusion of additional components to improve hybrid matching or intentional unmatching, and a CALLER_ID* signal used to activate circuitry to allow AC coupling to the TIP or RING signals to provide snooping without drawing AC current as necessary for the caller ID function. All of these signals are connected to relays to provide the proper isolation.

The RI* or ring indication signal is provided from the codec/DAA board 200 to the DSP interface circuitry 116, as is the LCS signal. Similarly, the OH_RLY* signal is provided from the DSP interface 116.

Therefore, it can be seen that all of the connections between the modem engine 48 and the codec/DAA module 200 are digital only and the control signals and feedback signals have been isolated either by mechanical relays or by optoisolators.

An earlier attempt to resolve, the certification problem was tried in the SpeedPaq 14.4K modem manufactured by Compaq Computer Corporation. That modem was designed for application inside a notebook computer. Knowing this international certification problem, the modem was designed as two separate circuit boards, one containing the basic modem engine, and RJ-11 and RJ-45 jacks, the second one including the parts for the DAA. The SpeedPaq 14.4K differed from the preferred embodiment described above in that the codec was located on the same circuit board as the remainder of the modem engine components. As a result, TXA and RXA or the analog transmit and receive signals were provided over the connectors between the boards. Further, the TIP and RING signals were provided to the modem engine board to connect to the RJ-11 jack. Upon application to the certification bodies, it was determined that the transmission of these two analog signals to the modem engine board and the TIP and RING signal transmission was sufficient to require qualification, and thus requalification, of that board. Thus, while the SpeedPaq 14.4K was a first step, it was not completely successful in solving the recertification problem.

In contrast, only digital signals are transmitted between the two boards in the preferred embodiment, and therefore, the various national certification bodies have not required certification of the modem engine 48, only the codec/DAA board 200. This means that only the codec/DAA board 200 needs to be certified for each particular country and that changes to the modem engine 48 and to the computer system C in which the modem engine 48 is contained can be readily made without requiring recertification of the modem engine 48.

Figure 4:
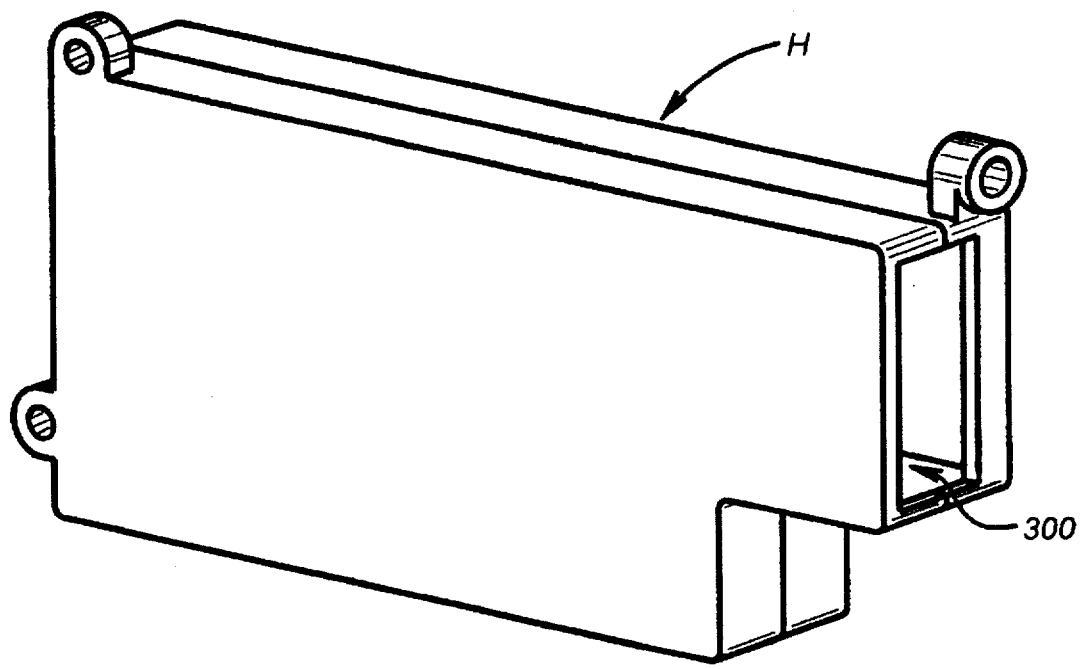
FIG. 4 is a perspective view of the housing for the codec/DAA circuit board.
Figure 5:
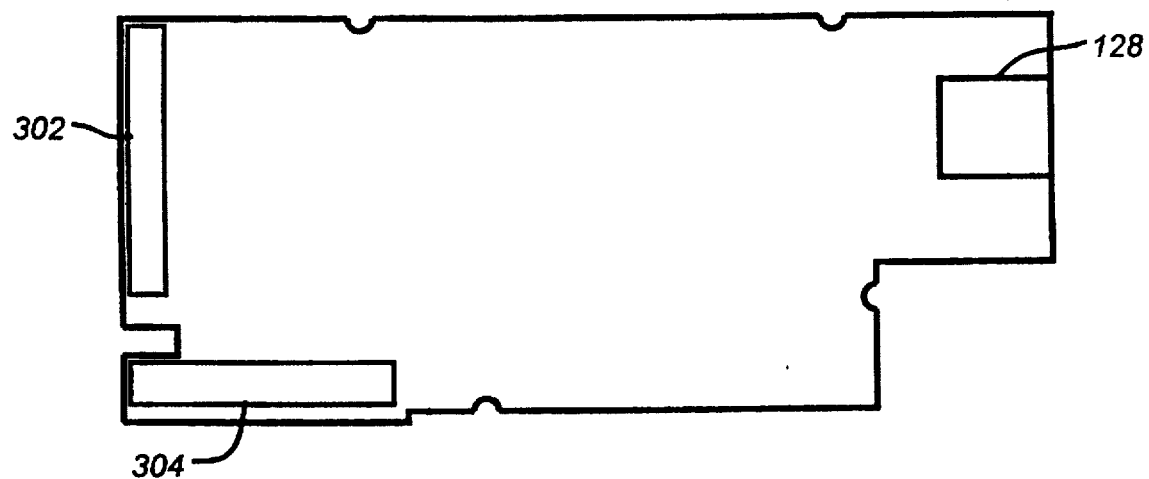
FIG. 5 is a top view of the circuit board of the codec/DAA board for installation in the housing of FIG. 4.

FIG. 4 is an illustration of the preferred embodiment of the housing H which contains the codec/DAA board 200. The housing H preferably is formed of plastic to provide necessary voltage protection and is formed of two pieces snapped together or seamlessly welded together using plastic welding techniques as is well known so that the housing H cannot be easily opened without destruction by the user. Thus, the housing H provides the necessary high voltage protection as required by the safety bodies. This high voltage protection had been a problem with the earlier SpeedPaq 14.4K modem, as the high voltage components were not independently shielded. The housing H contains a first opening 300 to receive the RJ-11 jack 128 necessary for connection to the telephone line, and two openings (not shown) to receive a connector cable from the modem engine 48. The arrangement of the connector cable can be more readily seen in FIG. 5 which is an illustration of the circuit board of the codec/DAA module 200. As can be seen, the RJ-11 jack 128 is provided at one end for provision through opening 300 and two parallel wired connectors 302 and 304, which correspond to connector 149, are provided for alternate physical arrangements of the housing H. A cable (not shown) connects one of the connectors 302 or 304 to the connector 49.

Therefore, a modem according to the present invention is divided into two portions and connected only using properly isolated digital signals. In this manner, all of the components necessary for certification can be placed in one portion and the remaining modem engine components placed on a board not requiring certification, allowing easy upgrading for improved performance of the modem.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A modem for use with a computer system to allow communication over a telephone line, the modem comprising:

a modem engine portion, said modem engine portion including:

a computer system interface;

a microcontroller connected to said computer system interface, said microcontroller providing first digital control signals;

a data pump providing second digital control signals and receiving first data signals a first connector connected to said microcontroller and said data pump for transferring said first digital control signals from said microcontroller, said second digital control signals from said data pump, and said first data signals to said data pump; and a first circuit board on which said computer system interface, said microcontroller, said data pump and said first connector are located; and a data access arrangement portion, said data access arrangement including:
      a second connector for transferring said first digital control signals and said second digital control signals from said first connector and for transferring said first data signals to said first connector;
      a codec for receiving said second digital control signals from said second connector and providing said first data signals to said second connector;
      circuitry configured for connection to the telephone line for receiving first digital control signals from said second connector, for receiving telephone line signals from said telephone line, and for providing said telephone line signals to said codec; and
      a second circuit board on which said codec, said circuitry and said second connector are located,
   wherein said first circuit board and said second circuit board are separate circuit boards.

2. The modem of claim 1, wherein said data access portion is contained in an enclosed housing to provide high voltage protection.

3. The modem of claim 1, wherein said data access arrangement circuit includes a plurality of relays receiving said first and second digital control signals from said modem engine portion and includes a plurality of optoisolators to provide digital control signals to said modem engine portion.

4. A computer system, comprising:

a system board portion, said system board portion including:

a processor;

a memory system coupled to said processor;

a video system coupled to said processor;

a modem engine portion associated with said processor, said modem engine portion including:

a computer system interface;

a microcontroller connected to said computer system interface, said microcontroller providing first digital control signals;

a data pump providing second digital control signals and receiving first data signals;

a first connector connected to said microcontroller and said data pump for transferring said first digital control signals from said microcontroller, said second digital control signals from said data pump, and said first data signals to said data pump; and a first circuit board on which said computer system interface, said microcontroller, said data pump and said first connector are located; and a data access arrangement portion, said data access arrangement including:
      a second connector for receiving said first digital control signals and said second digital control signals from said first connector and for providing said first data signals to said first connector;
      a codec for receiving said second digital control signals from said second connector and providing said first data signals to said second connector;
      circuitry configured for connection to the telephone line for receiving first digital control signals from said second connector, for receiving telephone line signals from said telephone line, and for providing said telephone line signals to said codec; and
      a second circuit board on which said codec, said circuitry and said second connector are located,
   wherein said first circuit board and said second circuit board are separate circuit boards.

5. The computer system of claim 4, wherein said data access portion is contained in an enclosed housing to provide high voltage protection.

6. The computer system of claim 4, wherein said data access arrangement circuit includes a plurality of relays receiving said first and second digital control signals from said modem engine portion and includes a plurality of optoisolators to provide digital control signals to said modem engine portion.

* * * * *

UNITED STATES PATENT AND TRADEMARK OFFICE
CERTIFICATE OF CORRECTION

PATENT NO. : 5,737,397
DATED      : April 7, 1998
INVENTOR(S) : Skinker, et al.

It is certified that error appears in the above-indentified patent and that said Letters Patent is hereby corrected as shown below:

on the title page, please change the First inventors name
from "Benjamin H. Skinner" to -- "Benjamin H. Skinker"

Signed and Sealed this

Eleventh Day of August 1998

Attest:

BRUCE LEHMAN

Attesting Officer

Commissioner of Patents and Trademarks